United States Patent [19]

Burba et al.

[11] Patent Number: 4,673,710
[45] Date of Patent: Jun. 16, 1987

[54] POLYVINYL CHLORIDE PLASTISOLS

[75] Inventors: Christian Burba, Ascheberg-Herbern; Ulrich Goeke, Luenen; Norbert Esper, Bergkamen, all of Fed. Rep. of Germany

[73] Assignee: Schering AG, Berlin and Bergkamen, Fed. Rep. of Germany

[21] Appl. No.: 695,627

[22] Filed: Jan. 28, 1985

Related U.S. Application Data

[63] Continuation-in-part of Ser. No. 454,889, Dec. 30, 1982, Pat. No. 4,533,524.

[30] Foreign Application Priority Data

Jan. 16, 1982 [DE] Fed. Rep. of Germany ....... 3201265

[51] Int. Cl.$^4$ .............................................. C08L 63/02
[52] U.S. Cl. ................................ 525/111.5; 525/113; 525/121; 523/455
[58] Field of Search ..................... 525/111.5, 113, 121; 523/455

[56] References Cited

U.S. PATENT DOCUMENTS 2,845,557  7/1958  Safford ............................. 525/121
2,971,933  2/1961  Beal ................................. 525/111.5
4,146,520  3/1979  Bierwirth et al. ................ 156/333

FOREIGN PATENT DOCUMENTS 2759313  7/1979  Fed. Rep. of Germany ...... 525/113

*Primary Examiner*—John C. Bleutge
*Assistant Examiner*—Robert E. L. Sellers, II
*Attorney, Agent, or Firm*—Curtis, Morris & Safford

[57] ABSTRACT

Plastisols comprising a finely divided vinyl chloride polymer and the usual fillers, additives, and plasticizers, to which plastisols is added, as an adhesion promoter, an adduct formed between an epoxy compound and the condensation product formed between (1) a polyaminoamide, comprising polymerized fatty acids and an excess of a polyalkylene polyamine and (2) a carboxylic acid or an ester thereof, and methods for coating or adhering a substrate with such plastisols by applying said plastisols to the substrate and baking at temperatures of 90° C. and up.

4 Claims, No Drawings

POLYVINYL CHLORIDE PLASTISOLS

This application is a continuation-in-part of application Ser. No. 454,889 filed Dec. 30, 1982, now U.S. Pat. No. 4,533,524 granted Aug. 6, 1985.

The present invention relates to vinyl chloride plastisols having improved adhesion and to methods for bonding and coating substrates with such vinyl chloride plastisols at baking temperatures of or above 90° C. More in particular, said plastisols contain, as additives improving their adhesion, an adduct formed between an epoxy compound and a condensation product of a polymerized fatty acid, of a carboxylic acid, and of an excess of a polyalkylene polyamine, based on the carboxyl groups of the acid components.

Polyvinyl chloride and its copolymers have long been known to possess rot resistance to aggressive media; they are therefore widely used to impart corrosion resistance to metallic surfaces, to bond thin sheet metal structures, and to seal welds, especially in the automotive field.

Such coatings are applied to the surface of the materials to be protected mainly as vinyl chloride polymers containing a plasticizer (plastisols) by spread coating, roller coating or spray coating. In one widely used form, such coating materials (plastisols) are formed of (1) a vinyl chloride polymer adapted to being made into a paste and distinguished in particular by a defined swelling capacity in a plasticizer, (2) a plasticizer or mixture of plasticizers, (3) fillers and stabilizers, and (4) optional pigments and PVC processing aids.

The formulation of polyvinyl chloride coating materials which contain a plasticizer, their preparation, and methods of applying them are described in great detail in Krekeler Wick, Kunststoff-Handbuch (Plastics Handbook), 1963, Vol. II, part 1, pp. 396 et seq.

An important criterion for the quality of the plastisol is its adhesion to a metal substrate such as has been described. Loose adhesion of the protective film increases the likelihood of penetration by aggressive media. Water, for example, can readily seep in between the coating and the metal and corrode the latter. The poorer the adhesion of the protective film to the metal, the greater is the likelihood that this will occur.

Thus, there has been a need for plastisols which make it possible to produce high strength bonds between a wide variety of materials, and especially metallic materials.

To increase the adhesion of such coatings, it has already been proposed in published German patent application DOS No. 21 23 171 to work a mixture of a polyfunctional organic acid or its anhydride and of a polyfunctional organic base into the plastisol. The constituents of this mixture are said to react with each other even at cure temperatures of less than 140° C. with salt formation and to impart good adhesion to the plastisol.

However, as has been shown in published German patent application DAS No. 24 02 037, column 2, lines 25 to 27, and example 4 (d), following the directions given in published application DOS No. 21 23 171 does not lead to satisfactory results.

According to published German patent application DAS No. 26 54 871 (U.S. Pat. No. 4,146,520), polyaminoamides made from a polymerized mixture of fatty acids with a high content of trimeric and higher polymerized fatty acids and an excess of polyalkylene polyamines having a given imidazoline content are used as adhesion promoters in an amount from 0.5 to 5 weight percent, based on the plastisol mass.

These polyaminoamides permit a definite improvement in adhesive strength to be obtained. When used in low concentrations, however, and at low baking temperatures, they clearly leave room for further improvement with respect to adhesion, thermal stability, and elongation at rupture.

The object of the invention thus has been to develop adhesion promoters for polyvinyl chlorine plastisols, which promoters impart high adhesion to protective coatings and high bond strength to adhesive bonds, along with improved thermal stability and elongation at rupture, even when used in low concentration and at a low baking temperature.

In accordance with the invention, this object is accomplished by the use of plastisols comprising finely divided polyvinyl chloride or vinyl chloride copolymers, which plastisols contain the usual fillers, additives, and plasticizers, and which plastisols additionally comprise, as adhesion promoters, condensation products formed between (A) a polyaminoamide in turn formed between a
 (1) polymerized fatty acid and
 (2) an excess, based on carboxyl groups, of a polyalkylene polyamine, and
(B) at least one carboxylic acid or carboxylic acid ester of the formula

$$R^1-(COOR^2)_n.$$

wherein $R^1$ is an optionally substituted saturated or unsaturated aliphatic, araliphatic, or aromatic hydrocarbon having from 2 to 18 carbon atoms, $R^2$ is hydrogen or alkyl having from 1 to 8 carbon atoms, and n is 1 or 2, in amounts from 0.5 to 5 weight percent, based on the plastisol mass. The plastisols so prepared are baked onto a material to be coated or adhered at temperatures of 90° C. and up.

A further embodiment of the invention is that the polyaminoamide according to (A) is prepared from
(A)
 (1) a polymerized mixture of fatty acids with a high proportion (X) of trimeric and higher polymerized fatty acids, and
 (2) an excess of a polyalkylene polyamine having an imidazoline content (Y), in amounts from 0.5 to 5 weight percent, based on the plastisol mass, and the plastisols so prepared are baked onto a material to be coated or adhered at temperatures of 90° C. and up, a requirement being that if the value of either X or Y is less than 40% by weight, then the value of the other component is at least 40+Z % (Z being the different between the smaller value and 40), and preferably is 40+2Z %.

Polymerized fatty acids with varying contents of monomeric, dimeric, trimeric, and higher polymeric amines may be used in the preparation of the polyaminoamides used in accordance with the invention as adhesion promoters.

The term "polymerized fatty acids" refers, in a general way, to polymerized acids obtained from fatty acids. "Fatty acids" are unsaturated natural and synthetic monobasic aliphatic acids having from 8 to 22 carbon atoms, and preferably 18 carbon atoms. Fatty acids can be polymerized by known processes.

Polymeric fatty acids suited for use in accordance with the invention are commercial products having approximately the following composition:

| Monomeric acids | 5 to 15 weight percent |
|---|---|
| Dimeric acids | 55 to 80 weight percent |
| Trimeric and higher polymerized acids | 10 to 35 weight percent |

However, in accordance with the invention, polymerized fatty acids having elevated contents (X) of trimerized and higher polymerized acids are preferred. These acids may be prepared from the typical commercial products by selective reaction based on a free-radical mechanism according to published German patent application DOS No 25 06 211 or by generally known distillation methods and have approximately the following composition:

| Monomeric acids | 0 to 5 weight percent |
|---|---|
| Dimeric acids | 10 to 25 weight percent |
| Trimeric and higher polymerized acids (X) | 90 to 75 weight percent |

Suitable polyalkylene polyamines which are to be used concurrently in accordance with the invention are, in particular, amines susceptible of imidazoline formation of the formula $$H_2N-(-CH_2CH_2NH-)_m-CH_2CH_2NH_2.$$

wherein m = 1 to 5, for example diethylenetriamine, triethylenetetramine, or tetraethylenepentamine, which amines optionally may contain amounts of other amines (see Ullmanns Enzyklopaedie der technischen Chemie (Encyclopedia of Technical Chemistry), Vol. 14, 1963, p. 74). Other suitable amines are polyalkylene polyamines, not susceptible of imidazoline formation, of the formula $$H_2N-(-CH_2CH_2CH_2NH-)-_n-CH_2CH_2CH_2NH_2.$$

wherein n = 1 to 4, for example dipropylenetriamine or tripropylenetetramine. Polyalkylene polyamines having ethylene and propylene bridges as the alkylene groups, obtained by the cyanoethylation of amines followed by hydrogenation, for example, $N_3$-amine and $N_4$-amine (see leaflet of BASF AG, 1976), are also suitable for use.

In accordance with the invention, other amines, too, may be used concurrently, such as amines of the formula $$H_2N-R-NH_2.$$

wherein R is an aliphatic hydrocarbon group, optionally substituted or interrupted by hetero atoms, and in particular oxygen atoms, having from 2 to 36 carbon atoms, and more particularly from 6 to 20 and 36 carbon atoms, such as 1,2-diaminoethane, 1,6-diaminohexane, 1,9-diaminononane, 1,12-diaminododecane, dimeric fatty acid amines (prepared by known processes from dimeric fatty acids), the 2,2,4(4,4,2)-trimethylhexamethylenediamines, 1,7-diamino-4-oxa-heptane, 1,12-diamino-4,9-dioxadodecane, or 1,20-diamino-4,17-dioxaeicosane, or cyclic or alicyclic amines, which optionally may contain hetero atoms, and in particular nitrogen, such as 1,4-diaminocyclohexane, isophorone diamine, piperazine, dimethylpiperazine, or N-aminoethylpiperazine.

The excess of amines should be such that the polyaminoamides have amine values ranging from 200 to 450, and preferably from 300 to 400.

The carboxylic acids or carboxylic acid esters which may be used in accordance with the invention are those of the general formula $$R^1-(COOR^2)_n.$$

wherein $R^1$ is an optionally substituted saturated or unsaturated aliphatic, araliphatic, or aromatic hydrocarbon having from 2 to 18 carbon atoms, and n is 1 or 2. Examples are succinic acid, glutaric acid, adipic acid, pimelic acid, subaric acid, azelaic acid, sebacic acid, decanedicarboxylic acid, phthalic acid, isophthalic acid, terephthalic acid, benzoic acid, acetic acid, propionic acid, butyric acid, valeric acid, caproic acid, caprylic acid, capric acid, lauric acid, palmitic acid, stearic acid, aryl acid, crotonic acid, vinylacetic acid, oleic acid, linoleic acid, linolenic acid, maleic acid, fumaric acid, and cinnamic acid. In accordance with the invention, phthalic acid, isophthalic acid, benzoic acid, and especially terephthalic acid, are preferred.

The amount of the carboxylic acids ranges from 3 to 20 weight percent, and more particularly from 7 to 15 weight percent, based on the mixture of fatty acids used in forming the polyaminoamide.

The reaction is carried out in the usual manner, a polyaminoamide being formed in a first step from the components (A) (1) and (2) at a temperature ranging from about 210° to 260° C., optionally under vacuum, said polyaminoamide then being reacted in a second step with component (B) under the same conditions.

The reaction conditions may be varied conventionally in such a way that the end products have the desired imidazoline content (Y).

The adhesion promoters preferred in accordance with the invention are prepared with the concurrent use of a polymerized mixture of fatty acids having an elevated amount (X) of trimeric and higher polymerized fatty acids and having an imidazoline content (Y), a requirement being that if the value of either (X) or (Y) is less than 40% the value of the other component should be at least 40+Z % (Z being the difference between the smaller value and 40), but preferably 40+2Z %.

Because of the complex composition of the components, the content (X) of trimeric and higher polymerized fatty acids and the imidazoline content (Y) are variable, particularly with respect to the lower range. While the effects obtainable in accordance with the invention depend primarily on the kind and amount of the concurrently used carboxylic acids according to (B), they are influenced also by the content of trimeric and higher polymerized acids as well as by their ratio to one another, by the imidazoline content of the polyaminoamide/polyaminoimidazoline mixture, and by the kind and amount of the amine or mixture of amines used.

Polyaminoamides made from fatty acids having a content of trimeric and higher polymerized components of 40% or more and an imidazoline content in the condensation product likewise of 40% or more are preferred.

The upper limit on the content of trimeric and higher polymerized fatty acids is 100%; the upper limit on the imidazoline content of the polyaminoimidazolines is the maximum value actually attainable for the calculated theoretically possible content for a particular mixture.

However, when the value of either X or Y is under 40%, the value of the other component should be at least 40+Z % (Z being the difference between the smaller value and 40), but preferably 40+2Z %, in order that a pronounced effect may be achieved.

The range in which both values are low is less preferred but still possible, within narrow limits. Thus, if one value is under 40% and the other under 50%, the difference between the smaller value and 40 should not be greater than 10.

The advantages offered by the invention are that the plastisol mixtures have practically unlimited storage stability, exhibit no or only minimal color changes after baking, and permit the adhesive strength to be markedly increased. A film applied to a substrate and exposed uncured to a humid atmosphere will yield a pore-free coating (no bubble formation) after baking. Further, and especially, these improvements can be secured with suitable formulations also with low concentrations of adhesion promoter at baking temperatures of 90° C. and up, and preferably of 110° C. and up.

The baking temperature which is optimum for a given polyvinyl chloride formulation (and which depends also on the gelation temperature of the PVC formulation used) can usually be simply determined by trial and error.

Suitable substrates for coating or bonding are all materials commonly used in this field, and particularly metals and glass.

Optionally, the polyaminoamide/polyaminoimidazoline mixtures described above and used in accordance with the invention may be converted to the corresponding Schiff bases and, optionally, enamines, by means of commonly used ketones such as acetone, methyl ethyl ketone, diethyl ketone, methyl isobutyl ketone, cyclohexanone, cyclopentanone, diisobutyl ketone, 3,3,5-trimethylcyclohexanone or methyl phenyl ketone, or aldehydes such as acetaldehyde, butyraldehyde, isobutyraldehyde, or benzaldehyde.

The reaction is carried out by known methods and may be catalyzed with acids and conducted with or without solvents. It is also possible to use the carbonyl compounds themselves in place of a solvent as an entrainer for the water or reaction to be eliminated.

Optionally, adducts of the free amino groups of the above polyaminoamides/polyaminoimidazolines may be formed with epoxy compounds used in deficiency.

Suitable epoxy compounds are, for example, epoxides derived from polyhydric phenols, and in particular bisphenols such as diphenylolpropane (bisphenol A), diphenylolmethane (bisphenol F), and phenol-formaldehyde condensation products (novolacs), as well as from aromatic di- and polycarboxylic acids, for example the phthalic acids.

The adducts are obtained by reacting an equivalent of active hydrogen of the amine compound with from 0.5 to 0.005, and more particularly from 0.2 to 0.03, equivalent of epoxide oxygen of the polyepoxide.

Moreover, the mixtures of polyaminoamides and polyaminoimidazoline, their epoxy adducts containing amino groups, as well as the Schiff bases and, optionally, enamines which can be prepared from these two product groups, may also be mixed with one another and used as adhesion promoters.

A better understanding of the invention and of its many advantages will be had by referring to the following Examples, given by way of illustration.

The fatty acids used in the Examples have the following composition, determined by gas-liquid chromatography (GLC):

| | | |
|---|---|---|
| (1) | Monomeric fatty acid | 9% |
| | Dimeric fatty acid | 75% |
| | Trimeric and higher polymeric fatty acids | 16% |
| (2) | Monomer fatty acid | 1% |
| | Dimeric fatty acid | 25% |
| | Trimeric and higher polymeric fatty acids | 74% |
| (3) | Monomeric fatty acid | 1% |
| | Dimeric fatty acid | 96% |
| | Trimeric and higher polymeric fatty acids | 3% |

PREPARATION OF ADHESION PROMOTERS FOR THE PLASTISOLS OF THE INVENTION

Promoter Compositions I–VI

I. In certain of the compositions tabulated below, the carboxylic acids named in the table were added to a commercial adhesion promoter available under the tradename "EURETEK 505" and the mixture was subjected to secondary condensation by being heated under nitrogen to 210° C. and held at that temperature for 1 hour. A vacuum of about 100 mm Hg was then applied for 1 hour and secondary condensation was carried out for a further hour at 210° C. and 100 mm Hg. The conditions of condensation may be varied conventionally depending on the desired imidazoline content. ["EURETEK 505" is made by condensing 28 parts of a dimeric fatty acid comprising 9% of monomeric acid, 75% of dimers, and 16% of trimeric and higher polymeric acids and 28 parts of a dimeric fatty acid comprising 1% of monomeric acid, 25% of dimers and 74% of trimeric and higher polymeric acids (saponification number=195, acid number=180) with 29.9 parts of triethylene tetramine (amine number=1420). The product has an amine of 380 and an imidazoline content of 60%].

The reaction products obtained were added to a plastisol as a 60% mixture with the plasticizers named, where DOP is dioctyl phthalate and BZA is benzyl alcohol.

II. In place of "EURETEK 505", the polyaminoamide commercially available under the tradename "VERSAMID 140" was condensed and used as above. ["VERSAMID 140" is made by condensing 290 parts of the same dimeric acid mentioned above for the synthesis of "EURETEK 505" with 156 parts of triethylene tetramine. The product has an amine number of 367 and an imidazoline content of 60%].

III. In place of "EURETEK 505", a polyaminoamide according to German patent application DAS No. 26 54 871 and made from 800 g of polymeric fatty acid (1), 200 g of polymeric fatty acid (2), and 534 g of triethylene tetramine was prepared (amine number=387; imidazoline content=78%) and was condensed and used as above.

IV. Example 3 was followed to prepare a commerical polyaminoamide, except that 800 g of fatty acid (3) were used as the polymerized fatty acid, condensed with 334 g of triethylene tetramine (amine number=375; imidazoline content=75%).

V. 100 g of the condensation product of "VERSAMID 140" plus 5% of azelaic acid, reported as Example 11 in Table I below, were further reacted with 3% of a diglycidyl ether comprising bisphenol A and having an epoxy value of 0.53 to form an adduct by stirring at 80° C. for 6 hours. The properties of a plastisol containing this promoter composition are reported in Example 14 in Table I.

VI. 100 g of the condensation product of "VERSAMID 140" plus 5% of isophthalic acid, reported as Example 10 in Table I below, were further reacted with an excess of methyl ethyl ketone under reflux with a water separator until water separation was complete. Excess ketone was distilled off in vacuum leaving a product containing ketimine groups. The properties of a plastisol containing this promoter composition are reported as Example 15 in Table I.

PREPARATION OF PLASTISOLS 1 weight percent of the adhesion promoters named, or of any desired mixtures thereof, based on the total mixture, was added to a plastisol composed of 45 parts by weight of polyvinyl chloride having a K value of 70 and adapted to be made into a paste,
55 parts by weight of phthalic acid di-2-ethylhexyl ether,
100 parts by weight of a filler mixture of 50% of chalk and 50% of barium sulfate, and
1.5 parts by weight of diisobutyltin isooctylthioglycolate ester.

However, the adhesion promoters may also be added to commonly used plastisol formulations other than the one specified above in order to obtain self-adhesive plastisols in accordance with the invention.

The bond strengths of adhesive bonds obtainable with the plastisols of the invention were determined according to DIN 53 283 by measuring the tensile shear strength. For this purpose, type 901 bonderized metal sheets obtainable from Metallgesellschaft, Frankfurt, were used as parts to be bonded. These were 2.5 cm wide, 10.5 cm long, and 0.15 cm thick. The thickness of the layer of plastisol forming the adhesive joint was set by means of spacers to 2 mm. The parts were heated at 160° C. for 30 minutes and in the process bonded to overlap one another by 15 mm. The tensile shear strengths listed under "Bond strength" in following Table I were obtained.

TABLE I

Examples in accordance with the invention

| Example | Promoter Composition | Characteristic values | Amine value | Imidazoline percentage | Bond strength (kp/cm²) | 60% mixture with |
|---|---|---|---|---|---|---|
| 1 | "EURETEK 505" plus 5% phthalic acid | I | 337 | 53 | 22.8 | DOP |
| 2 | as above | I | 338 | 65 | 22.0 | |
| 3 | "EURETEK 505" plus 5% dimethyl terephthalate | I | 385 | 60 | 24.4 | DOP/BZA 9:1 |
| 4 | "EURETEK 505" plus 10% dimethyl terephthalate | I | 286 | — | 26.5 | DOP/BZA 1:1 |
| 5 | "EURETEK 505" plus 5% isophthalic acid | I | 345 | 67 | 23.9 | DOP/BZA 8:2 |
| 6 | "EURETEK 505" plus 10% isophthalic acid | I | 296 | 61 | 24.4 | BZA |
| 7 | "EURETEK 505" plus 5% benzoic acid | I | 348 | — | 21.4 | DOP/BZA 9:1 |
| 8 | "EURETEK 505" plus 5% azelaic acid | I | 343 | — | 23.2 | DOP/BZA 9:1 |
| 9 | "VERSAMID 140" plus 5% dimethyl terephthalate | II | 343 | 67 | 17.8 | DOP/BZA 9:1 |
| 10 | "VERSAMID 140" plus 5% isophthalic acid | II | 346 | 60 | 16.6 | DOP |
| 11 | "VERSAMID 140" plus 5% azelaic acid | II | 345 | 72 | 17.9 | DOP/BZA 9:1 |
| 12 | Polyaminoamide according to German patent application DAS 26 54 871 plus 5% dimethyl terephthalate | III | 343 | — | 21.9 | DOP/BZA 9:1 |
| 13 | Commercial polyaminoamide plus 5% dimethyl terephthalate | IV | 338 | — | 17.8 | DOP/BZA 9:1 |
| 14 | Example 11 plus 3% diglycidyl ether | V | 334 | 72 | 19.8 | DOP/BZA 9:1 |
| 15 | Example 10 plus methylethyl ketone | VI | 250 | 60 | 20.2 | DOP/BZA 9:1 |
| 16 | Example 5 plus 6% diglycidyl ether | V | 188 | 40.2 | 25.1 | DOP/BZA 9:1 |
| 17 | Example 8 plus 3% diglycidyl ether, 3% cresylglycidyl ether, in 4% BZA | V | 187 | — | 24.9 | DOP/BZA 9:1 |
| 18 | Example 7 plus 3% diglycidyl ether, 3% cresylglycidyl ether, in 4% BZA | V | 190 | — | 22.8 | DOP/BZA 9:1 |

TABLE II

| | | Prepared in accordance with Example | Characterists values | | Bond strength (kp/cm$^2$) | 60% mixture with |
|---|---|---|---|---|---|---|
| | | | Amine value | Imidazoline percentage | | |
| Example | Composition | | | | | |
| 1 | "EURETEK 505" | — | 376 | 60 | 16.2 | DOP |
| 2 | "VERSAMID 140" | — | 367 | 60 | 15.5 | DOP/BZA 9:1 |
| 3 | Polyaminoamide according to German patent application DAS 26 54 871 | III | 387 | 78 | 17.4 | DOP/BZA 9:1 |
| 4 | Commercial polyaminoamide | IV | 398 | 70 | 7.2 | DOP/BZA 9:1 |

Comparative examples without concurrent use of carboxylic acids

What is claimed is:

1. A plastisol comprising a polymer of vinyl chloride, a plasticizer therefor, a filler, and from 0.5 to 5 percent, by weight of said plastisol, of an adhesion promoter which is an adduct formed between an epoxy compound and the condensation product formed between (A) a polyaminoamide which is, in turn, the reaction product of a polymerized fatty acid and an excess, based on carboxyl groups, of a polyalkylene polyamine, and (B) a carboxylic acid or ester of the formula $$R^1-(COOR^2)_n.$$

wherein $R^1$ is a saturated or unsaturated aliphatic, araliphatic, or aromatic hydrocarbon having 2 to 18 carbon atoms, $R^2$ is hydrogen or alkyl having from 1 to 8 carbon atoms, and n is 1 or 2, wherein said carboxylic acid or ester (B) is present in an amount from 3 to 20 percent by weight of the fatty acid present in said polyaminoamide.

2. A plastisol as in claim 1 wherein said polyaminoamide (A) is formed between an amount of a polymerized mixture of fatty acids with a high proportion, X, of trimeric and higher polymeric fatty acids, and an amount of an excess of a polyalkylene polyamine having an imidazoline content, Y, wherein, if the value of either X or Y is less than 40 percent, then the value of the other component is at least (40+Z) percent, where Z is the difference between the smaller value of X and Y and 40.

3. A plastisol as in claim 2 wherein, if the value of either X or Y is less than 40 percent, then the value of the other component is at least (40+2Z) percent, where Z is the difference between the smaller value of X and Y and 40.

4. A plastisol as in claim 1 wherein said carboxylic acid or ester (B) is an aromatic carboxylic acid or an ester of such an acid.

* * * * *